United States Patent
Motoyama et al.

(10) Patent No.: US 6,285,968 B1
(45) Date of Patent: Sep. 4, 2001

(54) OBJECT SHAPE DETERMINING METHOD

(75) Inventors: Keiichi Motoyama, Wako; Toshiyuki Arima, Niiza; Masatoshi Shirotori, Asaka, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/112,928

(22) Filed: Jul. 9, 1998

(30) Foreign Application Priority Data

Jul. 11, 1997 (JP) .................................... 9-186820

(51) Int. Cl.$^7$ ........................................... G06F 9/455
(52) U.S. Cl. ....................... 703/1; 703/2; 703/9; 702/100
(58) Field of Search ....................... 703/1, 2, 9; 702/140, 702/138, 100, 12

(56) References Cited

U.S. PATENT DOCUMENTS

| | | | |
|---|---|---|---|
| 4,935,977 | 6/1990 | Koza | 5/237 |
| 5,559,729 | 9/1996 | Abe | 103/2 |
| 5,568,404 | * 10/1996 | Strumolo | 702/140 |
| 5,664,064 | 9/1997 | Nakao et al. | 706/13 |

OTHER PUBLICATIONS

S. Bryson, Paradigms for the Shaping of Surfaces in a Virtual Environment, Proceedings of the 25th Hawaii International Conference on System Sciences, IEEE, pp. 649–658, Jan. 1992.*

A. Jameson, Control Theory for Optimum Design of Aerodynamic Shape, Proceedings of the 29th IEEE Conference on Decision and Control, pp. 176–179, Mar. 1990.*

S. Obayashi et al., Genetic Algorithm for Aerodynamic Inverse Optimization Problems, First International Conference on Genetic Algorithms in Engineering Systems: Innovations and Applications, IEE, Sep. 12–14, 1995, Galesia, pp. 7–12.*

K. Matsushima et al., Aerodynamic Shape Design of Wings Using an Inverse Problem Approach, IEEE, High Performance Computing on the Information Superhighway, HPC Asia '97, pp. 271–276, Aug. 1997.*

R. Jamieson, Using CAD as an Aerodynamic Tool, IEE Colloquium on CAD in the Aerospace Industry, pp. 5/1–5/3, Jan. 1989.*

S. Obayashi, Aerodynamic Inverse Optimization with Genetic Algorithms, Proceedings of the IEEE International Conference on Industrial Technology, (ICIT '96), pp. 421–425, Jan. 1996.*

(List continued on next page.)

*Primary Examiner*—Kevin J. Teska
*Assistant Examiner*—Russell W. Frejd
(74) *Attorney, Agent, or Firm*—Lahive & Cockfield, LLP

(57) ABSTRACT

An initial object shape is set in a first process, a numeric fluid dynamic grid is generated on the surface of the object shape in a second process, and Navier-Stokes equations are numerically solved by numerical fluid dynamics based on the object and the grid generated with the object shape and an object surface pressure is determined in a third process. The noise generated by the object is a determined in a fourth process, by solving Curle's formula based on the object surface pressure, and noises are again determined in a fifth process by updating the object shape and repeating the first through fourth processes. By determining an object shape based on a shape which generates the smallest noise from among the noises determined by the fifth process, it becomes possible to determine a shape of the object as a shape capable of minimizing aerodynamic noise generated upon movement of the object through a fluid medium.

6 Claims, 22 Drawing Sheets

OTHER PUBLICATIONS

K. Motoyama et al., "Numerical Analysis for Aerodynamic Noise Reduction," *the confederation of European Aerospace Societics*, AAI–98–2334, pp. 765–771 (1998).

Ono et al. "An Analysis of A–pillar Wind Noise Using a Finite Difference Method with an Overlaid Grid System", *Autumnal Convention Proceedings 964 1966–10*, Society of Automotive Engineers of Japan.

Ikegawa et al. "Application of numerical analysis to aerodynamics/sound problems around high–speed Shinkansen cars", *Applied Mathematics*, vol. 6, No. 1, Mar., 1996.

* cited by examiner

FIG. 7

| CALCULATION NO. | XL | K1 | GENERATED NOISE PRESSURE |
|---|---|---|---|
| 1 | 1.10039E+00 | 8.79134E-01 | 2.85782E-03 |
| 2 | 2.70472E-01 | 7.12598E-02 | 2.79211E-03 |
| 3 | 6.18504E-01 | 1.77559E-01 | 1.77810E-03 |
| 4 | 4.98032E-01 | 4.53937E-01 | 2.47918E-03 |
| 5 | 1.51535E+00 | 3.47638E-01 | 3.52417E-03 |
| 6 | 5.11418E-01 | 1.70472E-01 | 1.97629E-03 |
| 7 | 2.43701E-01 | 1.70472E-01 | 2.83879E-03 |
| 8 | 6.18504E-01 | 1.84646E-01 | 1.85926E-03 |
| 9 | 6.18504E-01 | 1.77559E-01 | 1.77810E-03 |
| 10 | 1.90158E-01 | 6.59449E-01 | 2.93626E-03 |
| 11 | 6.72048E-01 | 1.84646E-01 | 3.67456E-03 |
| 12 | 6.18504E-01 | 1.84646E-01 | 1.85926E-03 |
| 13 | 6.18504E-01 | 1.77559E-01 | 1.77810E-03 |
| 14 | 6.18504E-01 | 1.63386E-01 | 1.72107E-03 |
| 15 | 6.18504E-01 | 1.77559E-01 | 1.77810E-03 |
| 16 | 6.18504E-01 | 1.63386E-01 | 1.72107E-03 |
| 17 | 1.43504E+00 | 4.18504E-01 | 3.46437E-03 |
| 18 | 3.10630E-01 | 5.38976E-01 | 2.39885E-03 |
| 19 | 1.47520E+00 | 9.28740E-01 | 2.77747E-03 |
| 20 | 7.79134E-01 | 7.83465E-02 | 4.00097E-03 |
| 21 | 1.47520E+00 | 6.45276E-01 | 2.70463E-03 |
| 22 | 6.18504E-01 | 1.63386E-01 | 1.72107E-03 |
| 23 | 7.79134E-01 | 1.63386E-01 | 3.88031E-03 |
| 24 | 6.85433E-01 | 5.03543E-01 | 4.63515E-03 |
| 25 | 6.72048E-01 | 6.45276E-01 | 4.35713E-03 |
| 26 | 7.25591E-01 | 1.63386E-01 | 4.11099E-03 |
| 27 | 6.18504E-01 | 1.63386E-01 | 1.72107E-03 |
| 28 | 6.72048E-01 | 1.63386E-01 | 3.09191E-03 |
| 29 | 6.18504E-01 | 1.63386E-01 | 1.72107E-03 |
| 30 | 6.18504E-01 | 6.16929E-01 | 4.88925E-03 |
| 31 | 6.72048E-01 | 1.63386E-01 | 3.09191E-03 |
| 32 | 7.25591E-01 | 1.63386E-01 | 4.11099E-03 |
| 33 | 6.18504E-01 | 1.63386E-01 | 1.72107E-03 |
| 34 | 6.72048E-01 | 1.63386E-01 | 3.09191E-03 |
| 35 | 6.18504E-01 | 1.63386E-01 | 1.72107E-03 |
| 36 | 6.72048E-01 | 1.63386E-01 | 3.09191E-03 |
| 37 | 6.18504E-01 | 1.63386E-01 | 1.72107E-03 |
| 38 | 6.72048E-01 | 1.63386E-01 | 3.09191E-03 |
| 39 | 6.18504E-01 | 1.63386E-01 | 1.72107E-03 |
| 40 | 6.72048E-01 | 1.63386E-01 | 3.09191E-03 |
| 270 | 4.04331E-01 | 7.87008E-01 | 5.61293E-03 |

CALCULATION NO. 001

CALCULATION NO. 006

CALCULATION NO. 014

CALCULATION NO. 021

CALCULATION NO. 002

CALCULATION NO. 007

CALCULATION NO. 017

CALCULATION NO. 023

CALCULATION NO. 003

CALCULATION NO. 008

CALCULATION NO. 018

CALCULATION NO. 024

CALCULATION NO. 004

CALCULATION NO. 010

CALCULATION NO. 019

CALCULATION NO. 025

CALCULATION NO. 005

CALCULATION NO. 011

CALCULATION NO. 020

CALCULATION NO. 026

FIG. 17

| CALCULATION NO. | XP | GENERATED NOISE PRESSURE |
|---|---|---|
| 1 | 1.35906E+00 | 1.15404E-03 |
| 2 | 1.72126E+00 | 9.52314E-04 |
| 3 | 8.70866E-01 | 8.33419E-04 |
| 4 | 8.23622E-01 | 6.52632E-04 |
| 5 | 1.07559E+00 | 1.15545E-03 |
| 6 | 1.34331E+00 | 1.24170E-03 |
| 7 | 1.32756E+00 | 1.15831E-03 |
| 8 | 1.23307E+00 | 1.18389E-03 |
| 9 | 9.65354E-01 | 8.63872E-04 |
| 10 | 8.23622E-01 | 6.52632E-04 |
| 11 | 8.07874E-01 | 5.35825E-04 |
| 12 | 8.23622E-01 | 6.52632E-04 |
| 13 | 1.20158E+00 | 1.14140E-03 |
| 14 | 1.32756E+00 | 1.15831E-03 |
| 15 | 8.23622E-01 | 6.52632E-04 |
| 16 | 9.49606E-01 | 8.71382E-04 |
| 17 | 8.07874E-01 | 5.35825E-04 |
| 18 | 8.07874E-01 | 5.35825E-04 |
| 19 | 8.23622E-01 | 6.52632E-04 |
| 20 | 8.07874E-01 | 5.35825E-04 |
| 21 | 8.07874E-01 | 5.35825E-04 |
| 22 | 1.53228E+00 | 1.24258E-03 |
| 23 | 1.41417E+00 | 1.24021E-03 |
| 24 | 1.66614E+00 | 1.17029E-03 |
| 25 | 1.80000E+00 | 1.26979E-03 |
| 26 | 8.31496E-01 | 7.09138E-04 |
| 27 | 8.78740E-01 | 8.62798E-04 |
| 28 | 9.02362E-01 | 9.27664E-04 |
| 29 | 1.66614E+00 | 1.17029E-03 |
| 30 | 8.07874E-01 | 5.35825E-04 |
| 31 | 8.00000E-01 | 4.69040E-04 |
| | | |
| 185 | 1.43780E+00 | 1.33088E-03 |
| 205 | 1.44567E+00 | 1.29703E-03 |

CALCULATION NO. 006

CALCULATION NO. 013

CALCULATION NO. 025

CALCULATION NO. 007

CALCULATION NO. 016

CALCULATION NO. 026

CALCULATION NO. 008

CALCULATION NO. 022

CALCULATION NO. 027

CALCULATION NO. 009

CALCULATION NO. 023

CALCULATION NO. 028

CALCULATION NO. 011

CALCULATION NO. 024

CALCULATION NO. 031

NORMALIZED AMPLITUDE OF NOISE LEVEL

NORMALIZED FREQUENCY SPECTRUM LEVEL

SCALED LENGTH

OBJECT SHAPE DETERMINING METHOD

BACKGROUND OF THE INVENTION

1. Field of the Invention

The present invention concerns an object shape determining method for deciding the shape of an object which moves through a fluid medium, and more specifically relates to an object shape determining method for deciding the shape of an object as a shape which minimizes aerodynamic noise generated by turbulence and other variations in flow when the object moves through the fluid.

2. Description of the Related Art

When deciding the shape of an object for reducing aerodynamic noise generated by turbulence and other variations in flow when the object moves through a fluid medium, it is mainly the case simply to rely on past experience, and an object shape determining method per se has not existed. Hereinafter, aerodynamic noises is also referred to as "noise".

For example, in designing a vehicle body, aerodynamic noise (noise generated by the air flow on the vehicle body) is detected based on a wind tunnel test, and should such aerodynamic noise not attain a desired value, the shape of the object is modified, and the wind tunnel test is repeated until a shape of the object which reduces the aerodynamic noise to a desired value is adopted. With respect to noise from the duct of a jet engine, it is known that noise can be reduced by making the duct chrysanthemum-shaped in cross-section, however, such a shape must still be determined on a trial and error basis.

In many cases, in addition to the techniques discussed above, a sound-insulating material or the like is used to perform additional noise reduction.

However, when determining the shape of an object according to the above-mentioned conventional techniques, because a trial and error decision process is employed, there are problems in terms of time expenditures required for deciding the shape, and in addition as the shape involved becomes more complex, the shape determination process is accompanied by further difficulty.

SUMMARY OF THE INVENTION

An object of the present invention is to provide an object shape determining method for deciding the shape of an object as a shape which can minimize aerodynamic noise generated upon movement of the object through a fluid medium.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a view showing a portion of a generated noise pressure calculation result in accordance with the object shape determining method according to an embodiment of the present invention;

FIG. 17 is a view showing a portion of a generated noise pressure calculation result with respect to another object, in accordance with the object shape determining method according to an embodiment of the present invention;

DESCRIPTION OF THE PREFERRED EMBODIMENTS

Following, an explanation shall be given of an object shape determining method according to the present invention, in accordance with an embodiment thereof.

Figure 1:
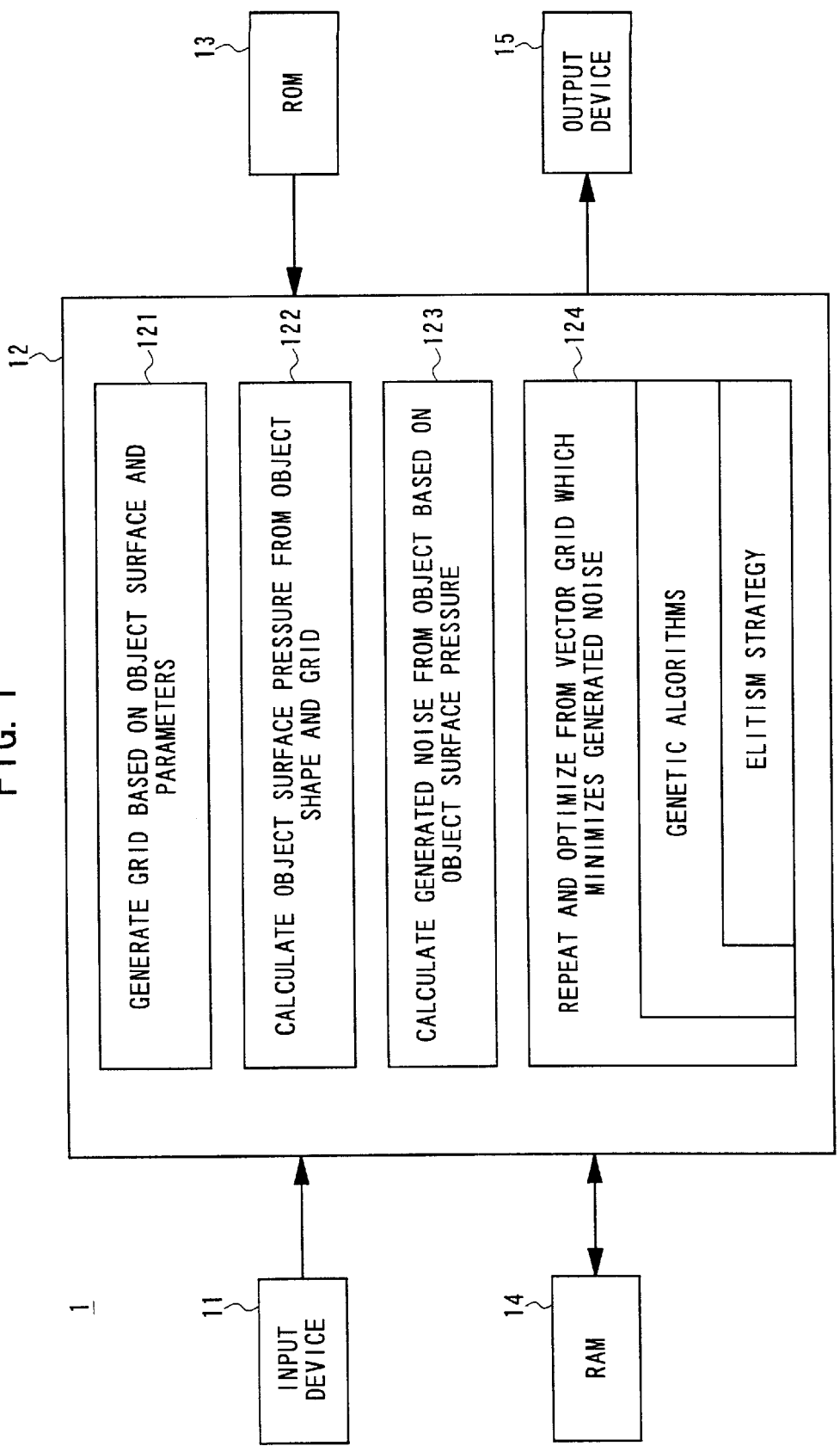
FIG. 1 is a block diagram showing the structure of a processing apparatus for effecting the object shape determining method according to an embodiment of the present invention.

FIG. 1 is a block diagram illustrating the structure of a processing apparatus 1 for effecting the object shape determining method according to an embodiment of the present invention.

The processing apparatus 1 is equipped by: an input device 11 in which the cross-sectional shape of a beforehand determined object (henceforth, unless there is a fear of confusion with a solid—i.e. outer—body shape, the term "object shape" shall simply be used), and further in which parameters for specifying successive modifications of the object shape are assigned; a central processing unit 12 which receives signals from the input device 11 and performs optimization operations for determining an object shape which minimizes generated noise; a ROM 13 storing therein a program for effecting the optimization operations in the central processing unit 12; a RAM 14 having a given working range; and an output device 15 including a display means for displaying, based on indications from the input device 11, a processing result by the central processing unit 12.

The prediction of aerodynamic noise generated on various object shapes can be operated according to Curle's formula or M. V. Lowson's formula. The present embodiments are exemplified by using Curle's formula.

The central processing unit 12 is operated based on a program stored in the ROM 13, and is made up functionally by: a grid generating means 121 for analyzing cells of an area with respect to an object surface modified based on the object surface and parameters indicated by the input device 11, and performing Computational Fluid Dynamic (CFD) grid generation therefor; a CFD calculating means 122 for solving by numerical calculation Navier-Stokes equations based on the finite elements generated by the grid generating means 121, and determining an object surface pressure from the object shape together with the generated grid; a noise calculating means 123 for calculating noise generated by the object moving through a fluid, based on a solution of the CFD calculating means 122, and more specifically by solving Curle's formula based on the object surface pressure; and an optimizing means 124, including genetic algorithms and an elitism strategy, for evaluating the object shape based on noise data calculated by the noise calculating means 123, and updating the parameter values in order to optimize them for minimizing generated noise.

An explanation shall next be given of processing for determining an optimized object shape by the processing apparatus 1, which is constructed as described above.

Figure 2:
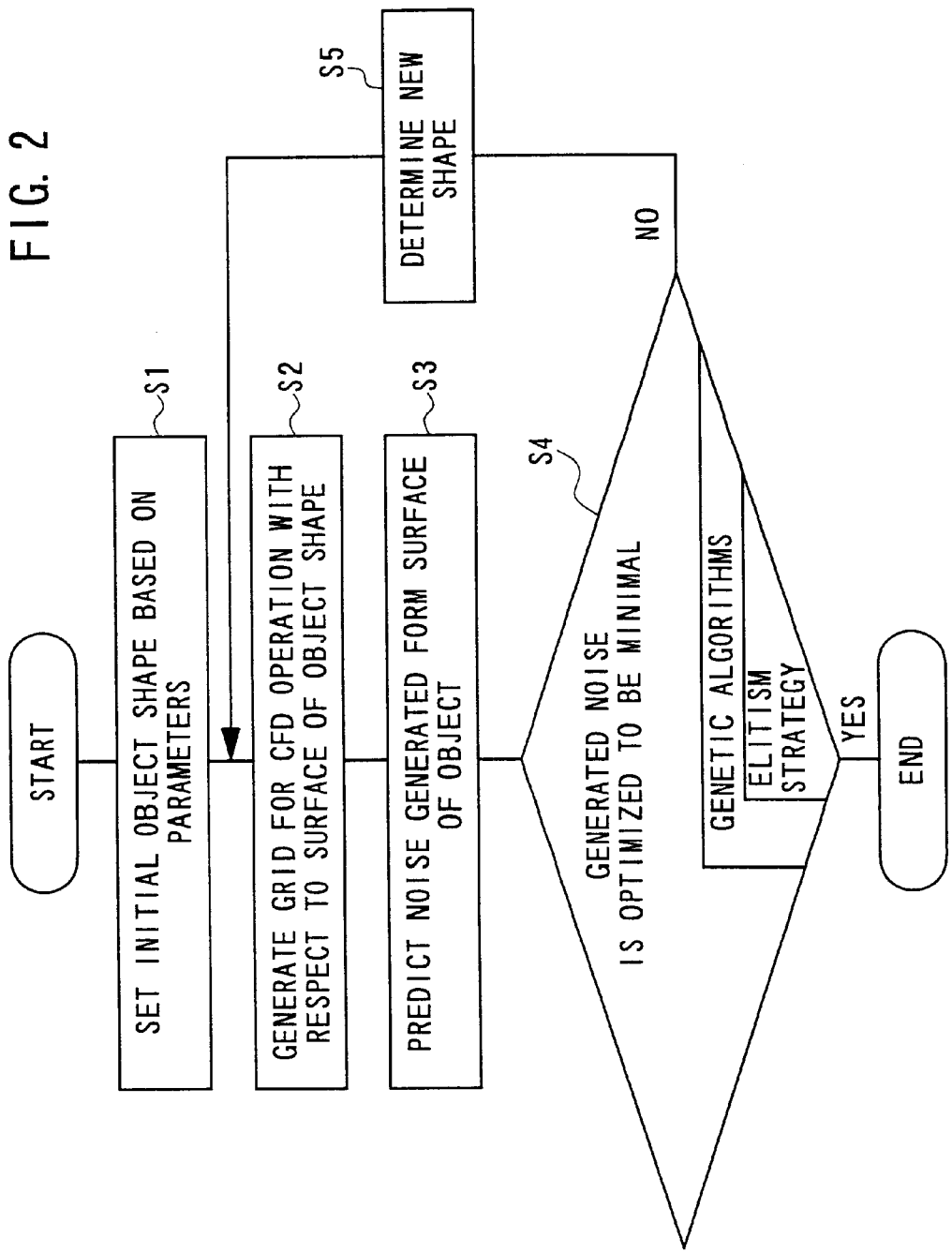
FIG. 2 is a flow chart showing the object shape determining method according to an embodiment of the present invention.

FIG. 2 is a flow chart of the object shape determining method. An initial object shape is set by the input device 11 along with parameters described below (Step S1). Next, with respect to the surface of the object shape, a concerned region thereof is cells and grid generation is performed (Step S2). Following generation of the grid, a CFD operation and a noise predictive operation are performed in which, more specifically, Navier-Stokes equations based on the generated grid are solved by numerical calculation, and an object surface pressure is determined from the object surface and the generated grid; and based on the determined object surface pressure, Curle's formula is solved wherein noise generated by movement of the object through a fluid is calculated (Step S3). An optimization evaluation is performed (Step S4) for minimizing the calculated noise, wherein when it is judged that noise is minimal, the object shape is decided upon as an optimal shape. Alternatively, when it is judged that the noise is not yet minimal, the parameter values are modified and an updated object shape is determined (Step S5), wherein following Step S5, based on the new shape, steps from Step S2 onward are again effected.

Next, the object shape determining method according to an embodiment of the present invention shall be explained, wherein the case of a vehicle side mirror is given as an example of a body whose shape is to be determined.

First, setting of the initial shape of the side mirror 20 shall be explained.

Figure 3:
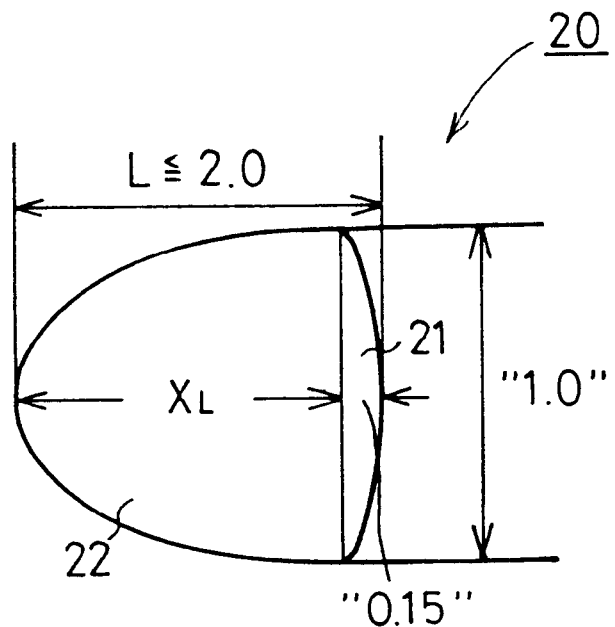
FIG. 3 is a view showing typically an optimized object shape in accordance with the object shape determining method according to an embodiment of the present invention.

The side mirror 20 is constructed from a mirror part 21 and a cover part 22. As shown in FIG. 3, the cross-sectional shape thereof is defined by: setting a height H=1 which normalizes the height of the side mirror 20, fixing a thickness of the mirror part 21 at 0.15, and making the cover part 22 to be roughly semi-elliptical in shape, having a thickness XL of between 0.15 and 1.85.

Figure 4:
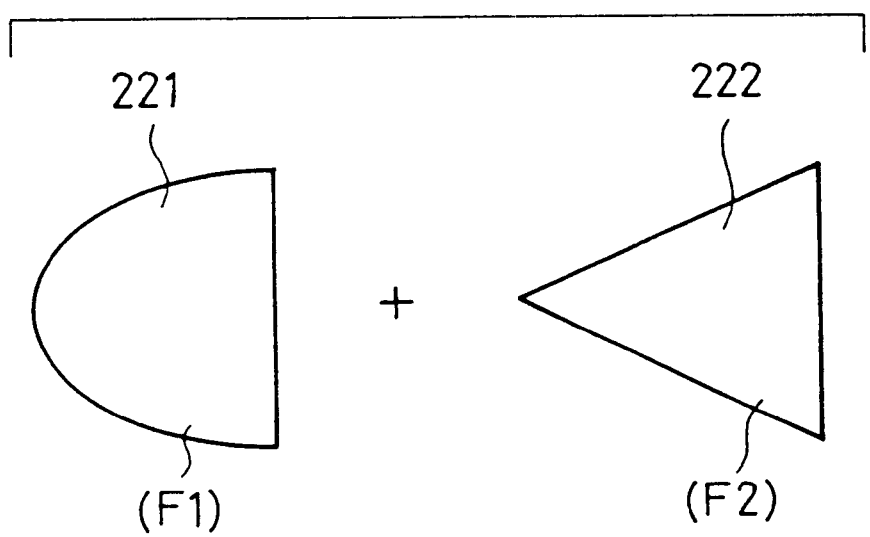
FIG. 4 is a typical view for explaining parameters making up the object shape shown in FIG. 3.

The shape of the cover part 22, as shown more specifically in FIG. 4, is a composite structure made up by assembling, respectively, a semi-elliptical shape (F1) 221 and an isosceles triangular shape (F2) 222, wherein the semi-elliptical shape (F1) 221 is ascribed a weighting of K1 and the isosceles triangular shape (F2) 222 is ascribed a weighting of (1−K1). Hence, the overall shape of the cover part 22 is defined by, F (shape)=K1×F1(semi-elliptical shape)+(1−K1)×F2(isosceles triangular shape)

wherein the weighting coefficient K1 is within a range of 0.05≦K1≦0.95. Keeping the weighting K1 within a range of 0.05<K1<0.95 is necessary in order to have the corner portions rounded when generating the CFD grid. Incidentally, if the weighting coefficient were set at K1=1, a semi-elliptical shape (F1) 221 only is formed, whereas if the weighting is set at K1=0, an isosceles triangular shape only is formed.

Accordingly, taking a thickness XL of the cover part 22 and the weighting K1 of the shape F (which is a combination of the semi-elliptical shape F1 and isosceles triangular shape F2) as parameters, a cross-sectional shape for the side mirror is decided, as described hereinafter, as a shape for minimizing generated noise. In this case, the initial shape at the start of calculation may be optionally set.

Next, with respect to the initial shape of the side mirror 20 determined as described above, a CFD grid is generated employing a lattice formation program, based on an elliptical partial differential equation.

Figure 5:
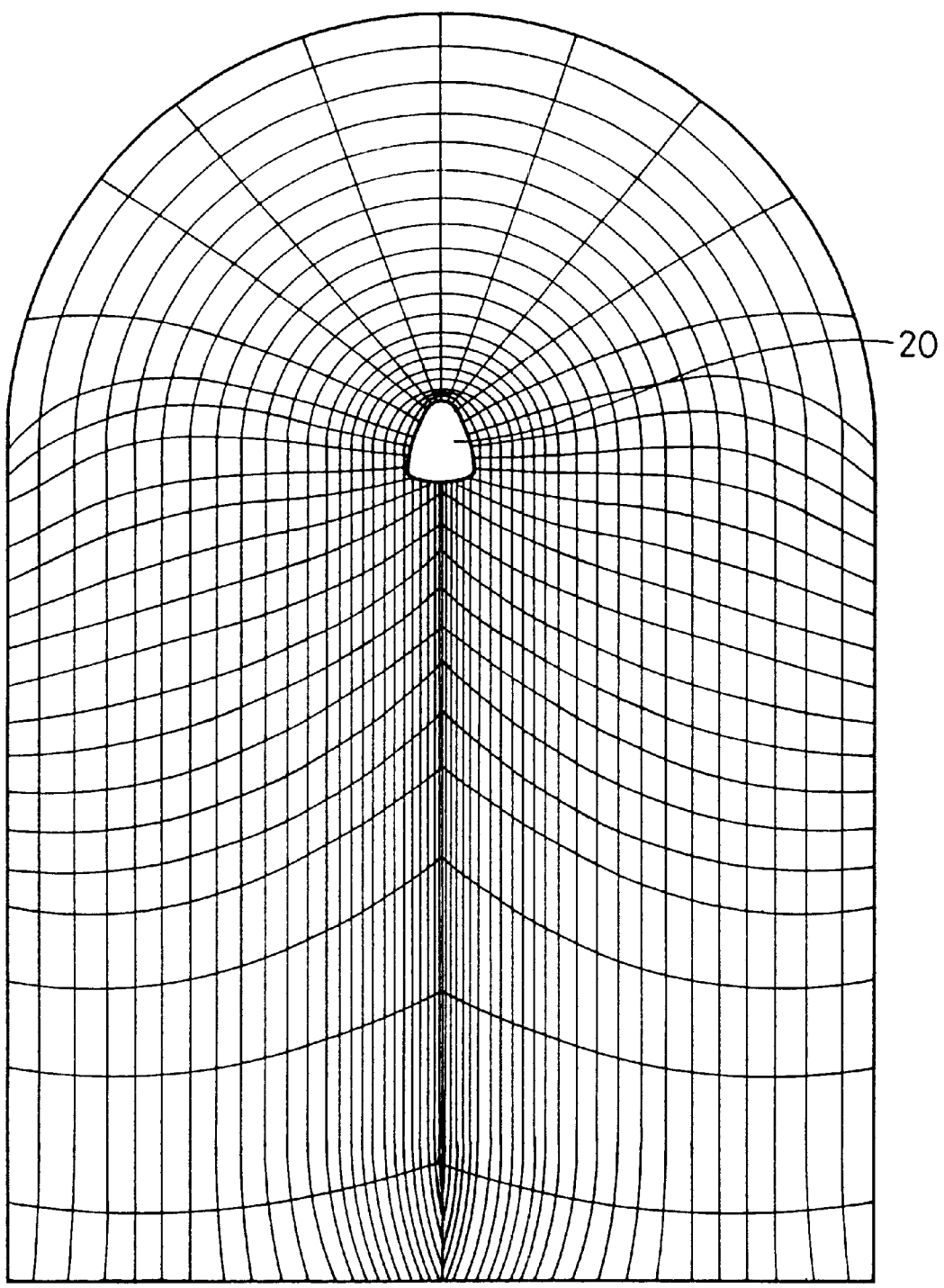
FIG. 5 is a view showing typically a grid which is computationally set for the object shape determining method according to an embodiment of the present invention.

FIG. 5 is a typical view showing an example of the generated grid.

In general, for the grid generation method, there exist both algebraic methods and methods employing partial differential equations. In the algebraic method, numerous map conversion functions are employed wherein the space is sampled discretely. By contrast, according to the differential equation type, which uses partial differential equations, further elliptical, hyperbolic and parabolic types are classified. Because the partial differential equation method is more versatile compared to the algebraic method, it is the method used in the embodiment of the present invention.

In the object shape determining method according to the embodiment of the present invention, the following equations (1) and (2) are used, in which two-dimensional Navier-Stokes equations are made non-dimensional using a uniform flow velocity and representative length in a flow field.

$$\text{div } \vec{V} = 0 \tag{1}$$

$$\frac{\partial \vec{v}}{\partial t} + (\vec{v} \cdot \nabla)\vec{v} = -\text{grad} P + \frac{1}{Re}\nabla \vec{v} \tag{2}$$

In equations (1) and (2), respective symbols have definitions as defined in equation (3), $\vec{V}$:velocity vector $\vec{V}$=(u, v);
P:pressure;
t:time;
Re:Reynulds Number (based on a uniform flow velocity and object representative length in a flow field); and $$\nabla : \nabla = \left(\frac{\partial}{\partial x}, \frac{\partial}{\partial y}\right) \tag{3}$$

along with the following boundary conditions,
(a) u=0, v=0 at the object surface, and
(b) u=1, v=0 at a far boundary.

As initial conditions, u=1 and v=0 are taken, and the following Poisson Equation (4) concerning pressure is derived from equations (1) and (2).

$$\Delta P = -\text{div}(\vec{v} \cdot \nabla)\vec{v} - \frac{\partial D}{\partial t} + \frac{1}{Re}\Delta D \tag{4}$$

where, $$\Delta = \frac{\partial^2}{\partial x^2} + \frac{\partial^2}{\partial y^2}$$

wherein, D in Equation (4) is defined by the following Equation (5).

$$D \equiv \text{div } \vec{v} \tag{5}$$

With respect to equations (2) and (4), which are converted to generalized coordinates, a Euler implicit method is employed for time differentiation, a high accuracy upwind differencing method is used for convection term, and for viscosity term, a second-order accuracy central differencing is used and discretely sampled, wherein the thus attained simultaneous equations are solved. Such a calculation is one in which the solution, based on the grid created in accordance with the above, is numerically determined.

The noise source for the aerodynamic noise is controlled by fluid dynamic sequential equations and equations of continuity, wherein the aerodynamic noise control equation is introduced by Curle.

Figure 6:
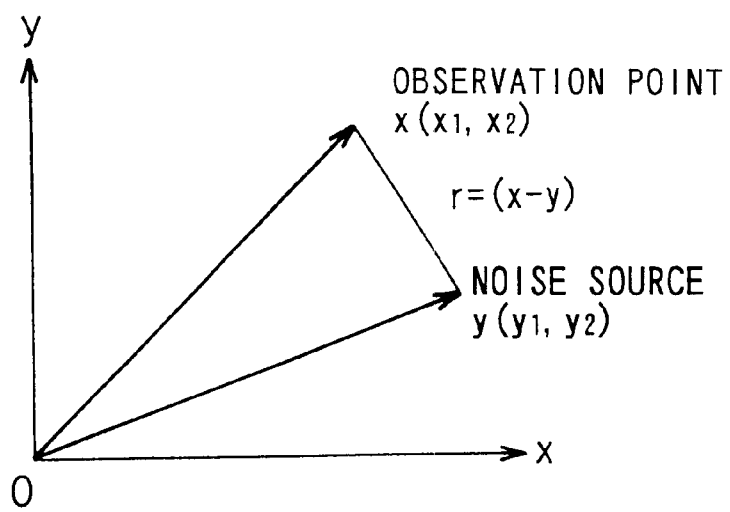
FIG. 6 is a typical view explaining a noise source position and observation point position, for the object shape determining method according to an embodiment of the present invention.

Herein, as shown in FIG. 6, generalized coordinates are considered. A noise source position y ($y_1$, $Y_2$), a position of observation x ($x_1$, $x_2$), and a distance between the noise source position and position of observation r=|x−y| are shown. In the case where fluid velocity is sufficiently lower than the velocity of sound, aerodynamic noise is represented by the following equation (6).

$$p(x, t) = \frac{1}{4\pi c} \int_s \frac{(x_i - y_i)}{r^2} \left[ \frac{\partial P_i\left(y, t - \frac{r}{c}\right)}{\partial t} \right] dS \tag{6}$$

wherein,
p(x, t):noise pressure at the point of observation;
c:sound velocity;
$x_i$:position vector for the point of observation;
$Y_i$:position vector of noise source;
$P_i$(y):surface pressure per unit area in the direction $x_i$ of fluid exerted on the object boundary;
t:time;
dS:infinitesimal displacement taken along the border circumference; and
r:distance between noise source and observation point (|x−y|)

Because the above is a two-dimensional equation, the subscripts i take the values of "1" and "2" respectively, and correspond to the X and Y directions at respective coordinates.

The value of $P_i$(y) in Equation (6) is determined in accordance with Computational Fluid Dynamics (CFD) methods, and in the object shape determining method according to the embodiment of the present invention, two-dimensional Navier-Stokes equations are solved for determining $P_i$(y).

Next, an operation for noise minimization, and more specifically an optimization evaluation, shall be explained.

As optimization methods, mathematical programming methods, gradient based methods, genetic algorithms, and the like, are known in the art.

In the object shape determining method according to the embodiment of the present invention, in the operation for optimization evaluation, an amplitude of the noise pressure forms an objective function, wherein thickness XL and weighting K1 are constraint conditions thereof.

A maximum value of thickness XL, minimum value of thickness XL, maximum value of the weighting K1 and minimum value of the weighting K1 are indicated by XLmax, XLmin, K1max and K1min, respectively. For the case of a noise minimizing operation to which 1-step width values (ΔXL, ΔK1) based on predetermined divisors are ascribed, pertaining respectively to thickness XL and weighting K1, the following calculation value results, which can be assumed to be expansive.

[{(XLmax−XLmin)/ΔXL}+1]×[{(K1max−K1min)/ΔK1}+1]

Hence, for the noise minimizing operation, genetic algorithms are employed which terminate in few calculation amounts, and further in which the danger of collapsing into local solutions is small, whereby optimal conditions are determined. Respective 7 bit ($2^7=128$) divisors are ascribed to the thickness XL ($0.15 \leq XL \leq 0.95$) and weighting K1 ($0.05 \leq K1 \leq 0.95$), and a genetic factor is expressed by a 7 digit binary number. Taking into consideration enlargement of operational time, according to the present example, the calculation is conducted under conditions of a population parameter (number of individuals) of 5 and a generation number of 50. FIG. 7 shows a portion of the calculation results of generated noise pressure levels calculated by the genetic algorithms, with respect to thickness XL and weighting K1 as parameters. In FIG. 7, the leftmost column shows the number of the calculation result, and E is an exponent of 10, for example E-03 indicates a value of $\frac{1}{1000}$. Because the calculation results are obtained using two-dimensional calculations, there is no meaning in terms of absolute value of the size.

Figure 11A:
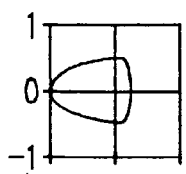
FIGS. 11A through 11T are typical views showing determined object shapes for purposes of optimization, in accordance with the object shape determining method according to an embodiments the present invention.
Figure 11F:
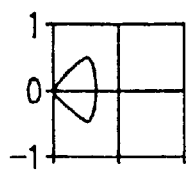
Figure 11K:
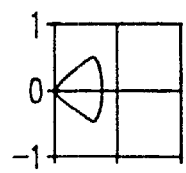
Figure 11P:
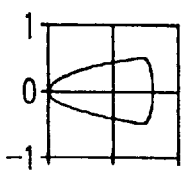
Figure 11B:
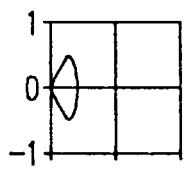
Figure 11G:
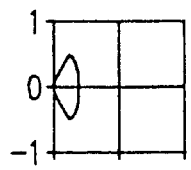
Figure 11L:
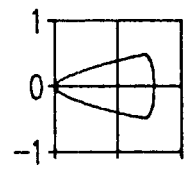
Figure 11Q:
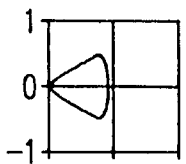
Figure 11C:
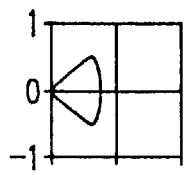
Figure 11H:
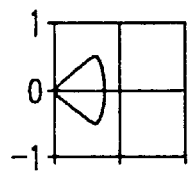
Figure 11M:
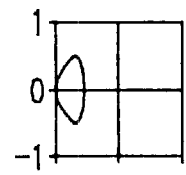
Figure 11R:
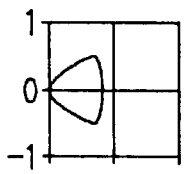
Figure 11D:
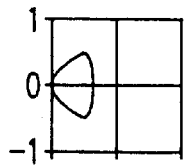
Figure 11I:
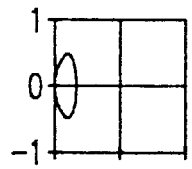
Figure 11N:
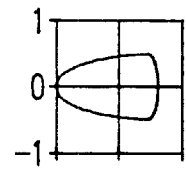
Figure 11S:
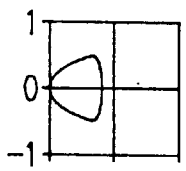
Figure 11E:
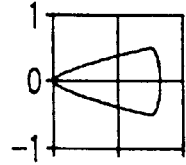
Figure 11J:
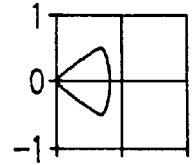
Figure 11O:
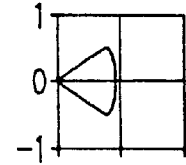
Figure 11T:
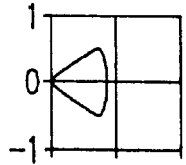

FIGS. 11A through 11T show typically shapes of the side mirror 20 with respect to the partial calculation results shown in FIG. 7. In FIGS. 11A through 11T, vertical and horizontal axes show the shape of the side mirror 20 by using a unit of scaled length.

Figure 8:
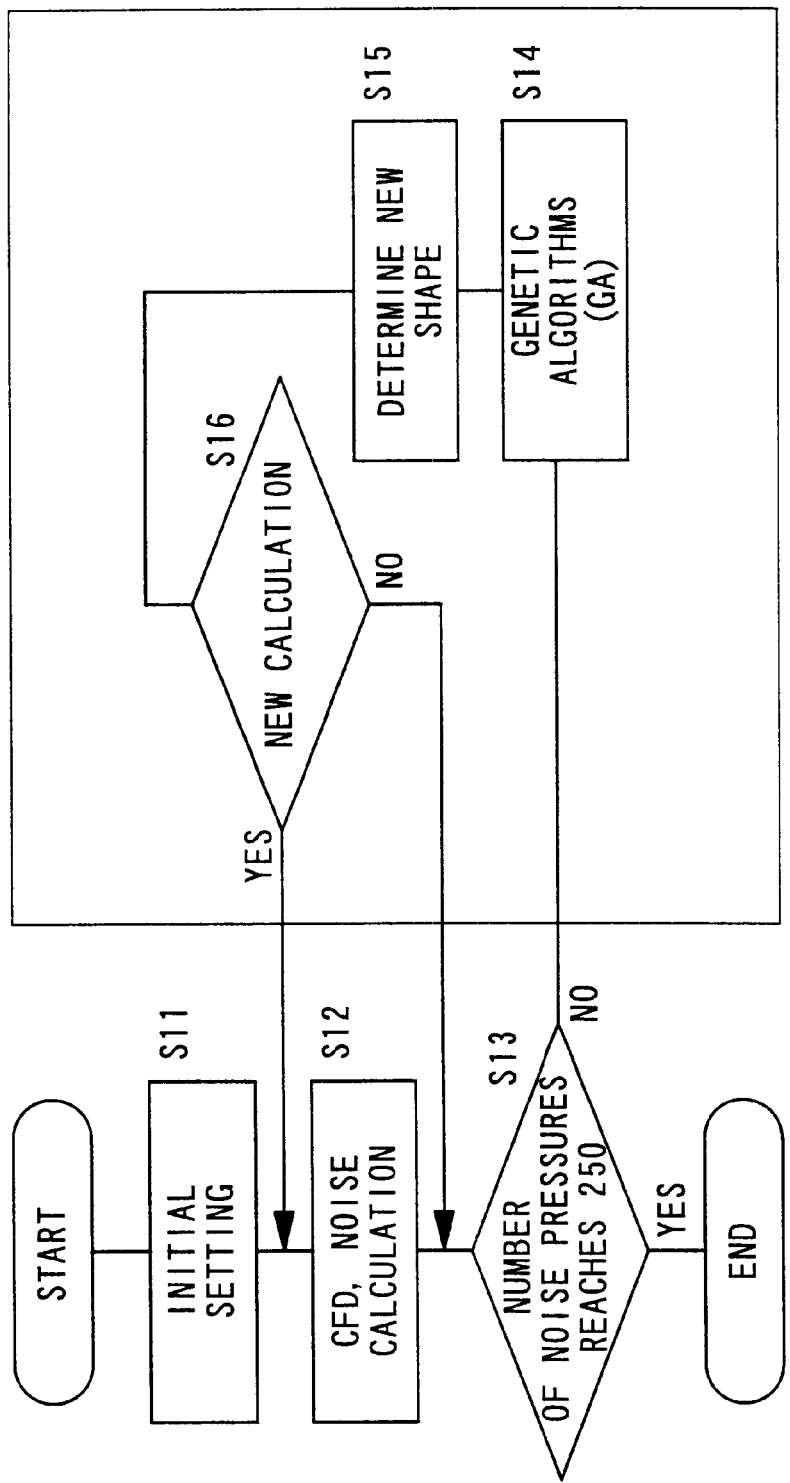
FIG. 8 is a flow chart when using genetic algorithms with an elitism strategy, in the object shape determining method according to an embodiment of the present invention.

Further, in the present example, as there are many calculation results for the genetic algorithms, a so-called elitism strategy is employed in performing the calculation, in which the most favorable result of each generation is reproduced and remains in successive generations. An example of such a strategy is shown in FIG. 8. More specifically, an initial setting is performed which is the same as the case of Step S1 (Step S11), and next, similar to Steps S2 and S3, a grid is generated, and CFD and noise predictive operations are performed (Step S12). Next, it is checked whether the number of calculated noise pressures has reached 250 (5 population parameters×50 generations) (Step S13). If it is judged that the number of calculated noise pressures has not reached 250, a further operation based on the genetic algorithms (GA) is performed (Step S14) and a new shape based on this operation is decided (Step S15), and next it is checked whether the new shape decided on in Step S15 represents a newly calculated result or not. If it is judged that the result in Step S16 is not a newly calculated result, following Step S16, the process is again effected from Step S13. If it is judged that the result in Step S16 is a newly calculated result, following Step S16, the process is again effected from Step S12.

In this manner, calculation conditions and calculation results at each step are recorded, and at the time that new calculation conditions are determined by the genetic algorithms (GA) the stored content is checked. If calculations were performed in the past using those same calculation conditions, calculations can be skipped and computational burden reduced.

Figure 9:
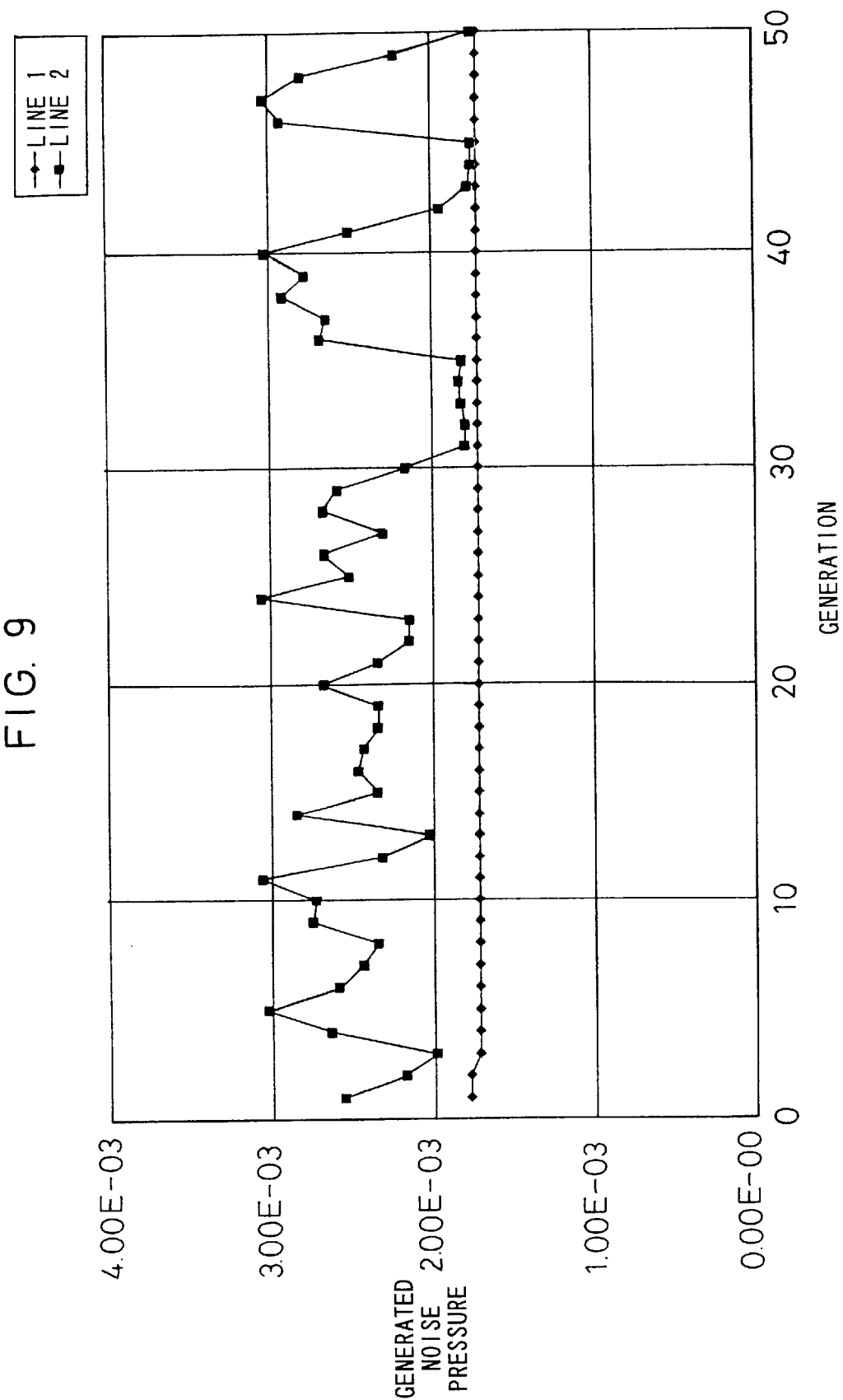
FIG. 9 is a view in which a generated noise pressure calculation results are shown graphically, in accordance with the object shape determining method according to an embodiment of the present invention.
Figure 10A:
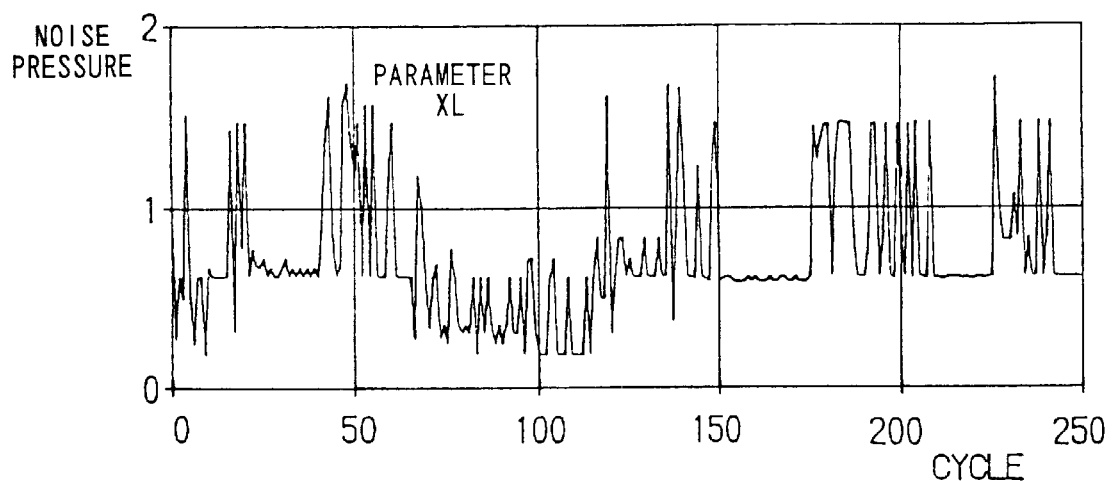
FIG. 10A and FIG. 10B are views in which parameter results, at the time of calculation of a generated noise pressure, are shown graphically, in accordance with the object shape determining method according to an embodiment of the present invention.
Figure 10B:
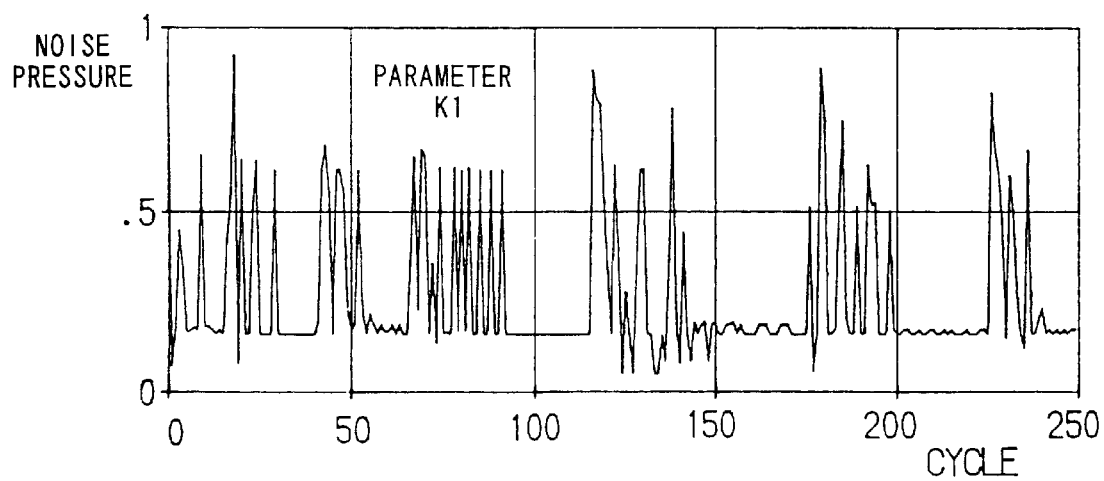

In FIG. 9, which shows the calculation results by the above-described genetic algorithms, noise pressure levels of noise generated from the body shape are indicated with respect to the thickness XL and weighting K1 parameters which are shown in FIGS. 10A and 10B. In FIG. 9, line 1 is a plot of the smallest generated noise pressure level from among population parameters of 5 in each generation, whereas line 2 is a plot of the average value of the calculation result at each generation. As made clear from FIGS. 7 and 9, the calculated noise pressure at calculation number 3 is the smallest value among the population parameters of 5, and thus it remains in the next generation. As the calculation progress in this manner, the generated noise determined by respective calculations at calculation numbers 14, 16, 22, 27 and 29 are the smallest, wherein the shape of the side mirror 20 at this time is the shape corresponding to calculation number 14, which is shown by FIG. 11K.

As a result, the cross-sectional shape determined by parameters of thickness XL=0.61850 and weighting K1=0.163386 is decided upon. By rotation of the cross-sectional shape, taking as an axis of rotation the longitudinal axis of the ellipse, the solid (outer) shape of the side mirror part 20 is determined.

Figure 12A:
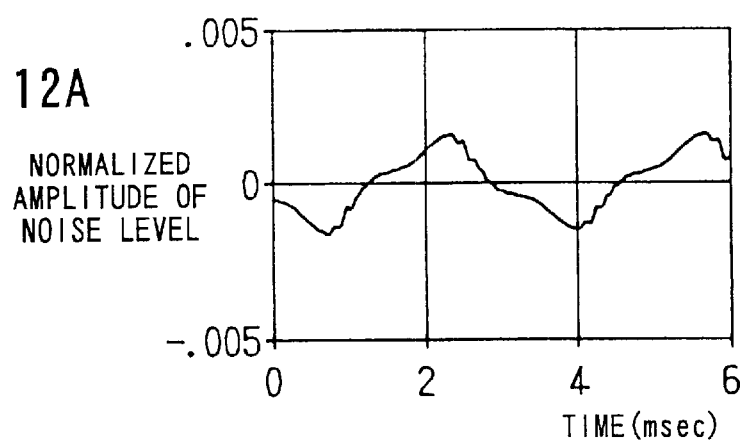
FIGS. 12A through 12C are typical views of a generated noise waveform, a frequency spectrum, and a shape of an object shape determined for optimization, in accordance with the object shape determining method according to an embodiment of the present invention.
Figure 12B:
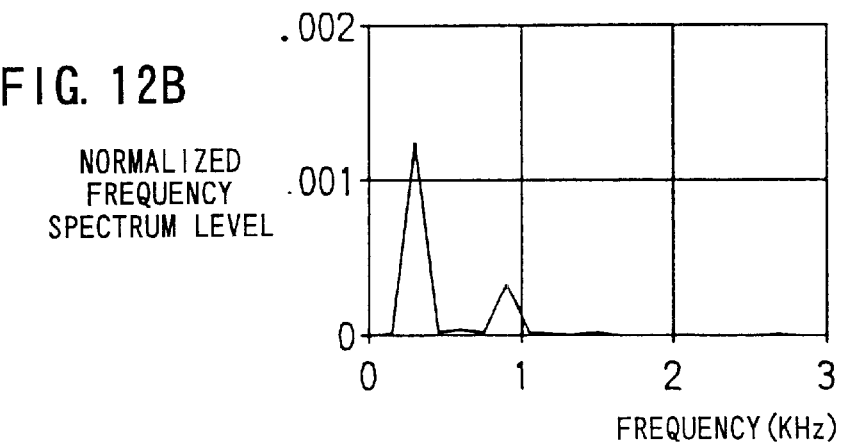
Figure 12C:
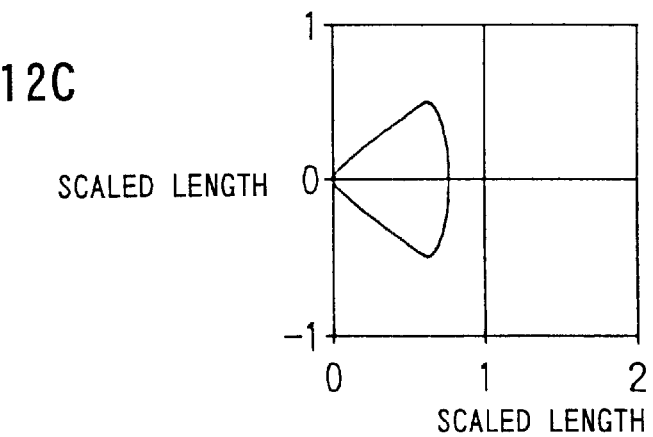
Figure 13A:
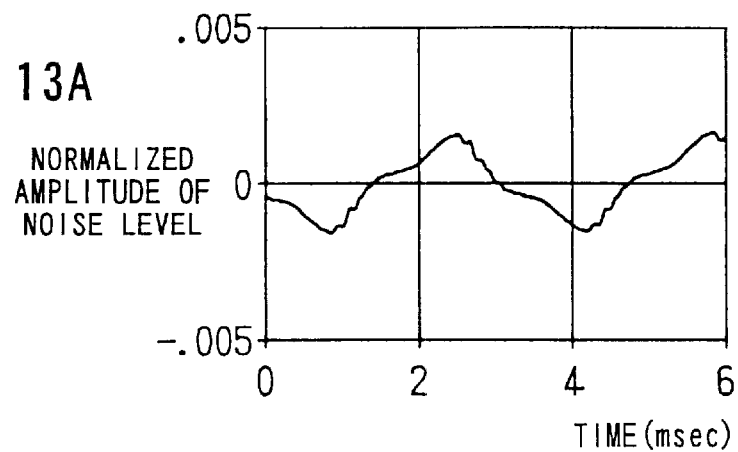
FIGS. 13A through 13C are typical views of a generated noise waveform, a frequency spectrum, and a shape of an object shape determined for optimization, in accordance with the object shape determining method according to an embodiment of the present invention.
Figure 13B:
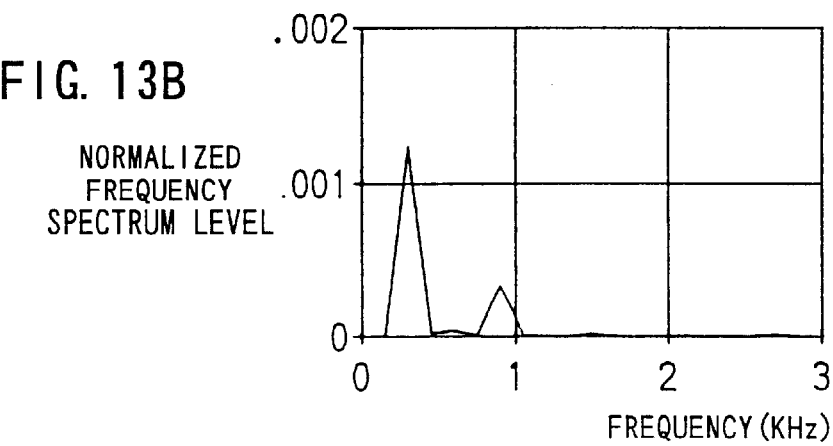
Figure 13C:
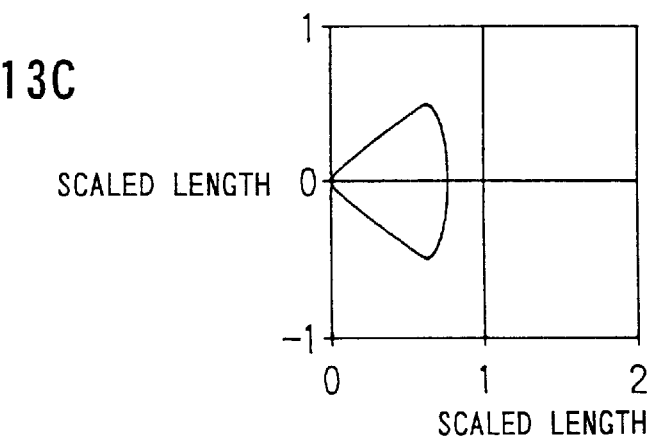
Figure 14A:
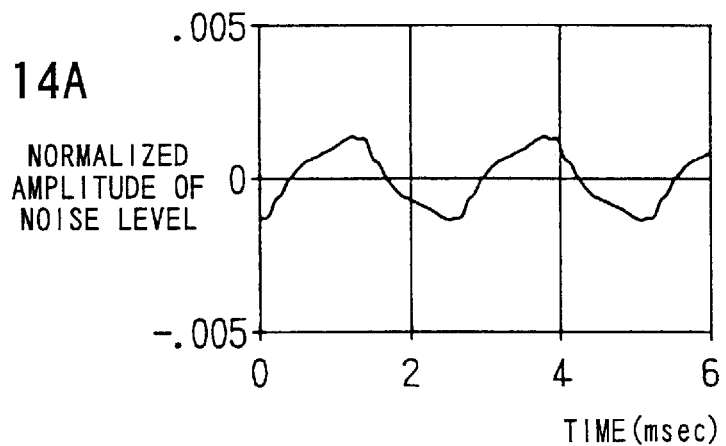
FIGS. 14A through 14C are typical views of a generated noise waveform, a frequency spectrum, and a shape of an object shape determined for optimization, in accordance with the object determining method according to an embodiment of the present invention.
Figure 14B:
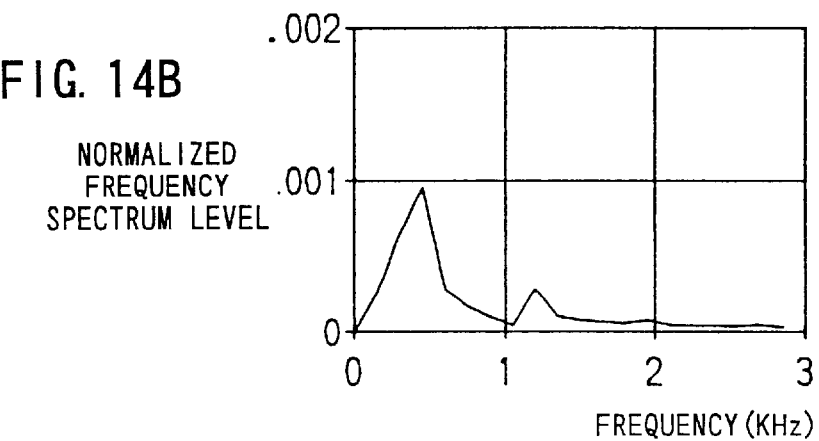
Figure 14C:
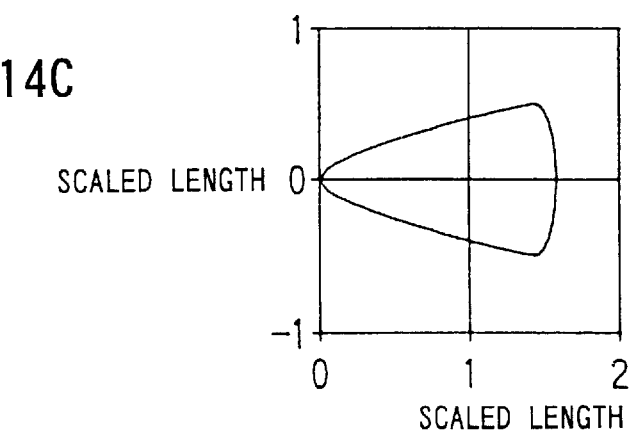
Figure 15A:
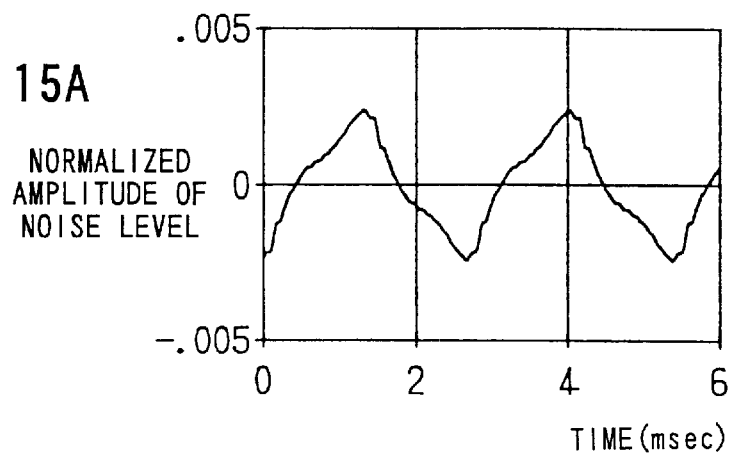
FIGS. 15A through 15C are typical views of a generated noise waveform, a frequency spectrum, and a shape of an object shape determined for optimization, in accordance with the object shape determining method according to an embodiment of the present invention.
Figure 15B:
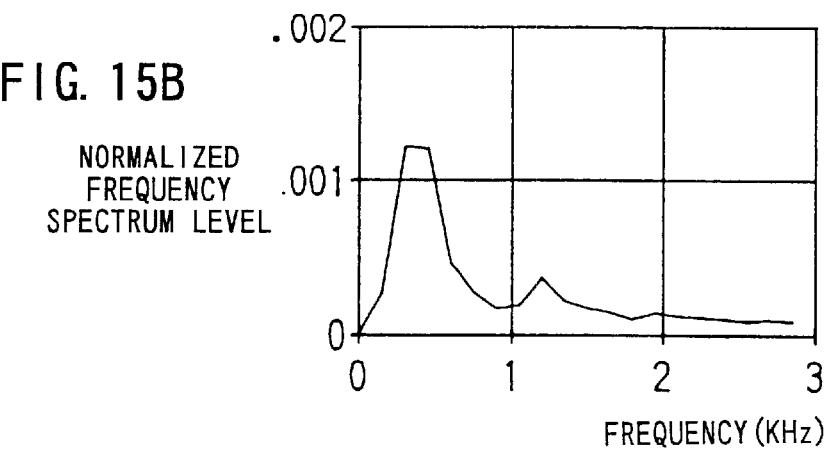
Figure 15C:
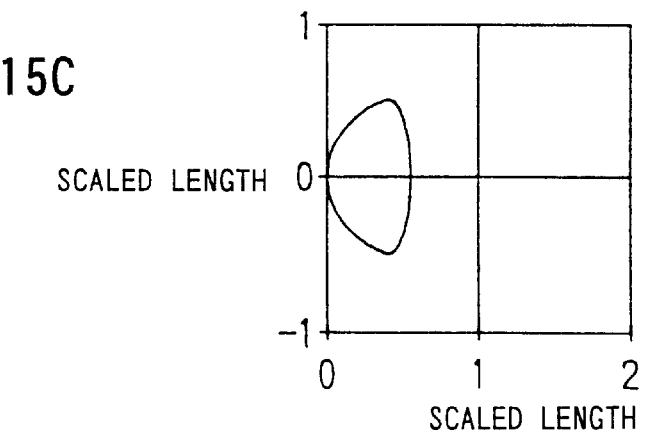

Further, the waveform of the generated noise, along with the frequency spectrum of the waveform, are shown by FIGS. 12A–12C, FIGS. 13A–13C, FIGS. 14A–14C and FIGS. 15A–15C. Specifically, FIGS. 12A–12C show the case of calculation number 3, FIGS. 13A–13C show the case of calculation number 14, and FIGS. 14A–14C show the case of calculation number 17, wherein the case of calculation number 14 indicates the smallest generated noise pressure. Further, FIGS. 12A, 13A, 14A and 15A show the waveform of the generated noise. Each of the horizontal axes thereof shows time and each of the vertical axes thereof shows normalized amplitude of the noise level. FIGS. 12B, 13B, 14B and 15B show the frequency spectrum. Each of the horizontal axes thereof shows frequency and each of the vertical axes thereof shows normalized frequency spectrum level. FIGS. 12C, 13C, 14C and 15C show typically the shape at that time by using a unit of scaled length for each of the horizontal and vertical axes thereof.

Herein, as stated above, noise calculations have been described for a case performed with 5 populations×50 generations. As made clear from FIG. 7, the smallest noise pressure according to this calculation is obtained. With respect to this case, for purposes of reference, the number of generations was increased and a result was obtained in which the calculation was performed with 5 populations× 100 generations (=500), wherein the smallest generated noise was obtained at calculation number 270. This is shown at the bottom of FIG. 7. Further, FIGS. 15A, 15B and 15C respectively show the generated noise waveform, frequency spectrum and the typical shape at this time for the case of calculation number 270.

Next, as a further example, the case of a cross-sectional shape of an antenna disposed on the airframe of an aircraft shall now be described.

Figure 16:
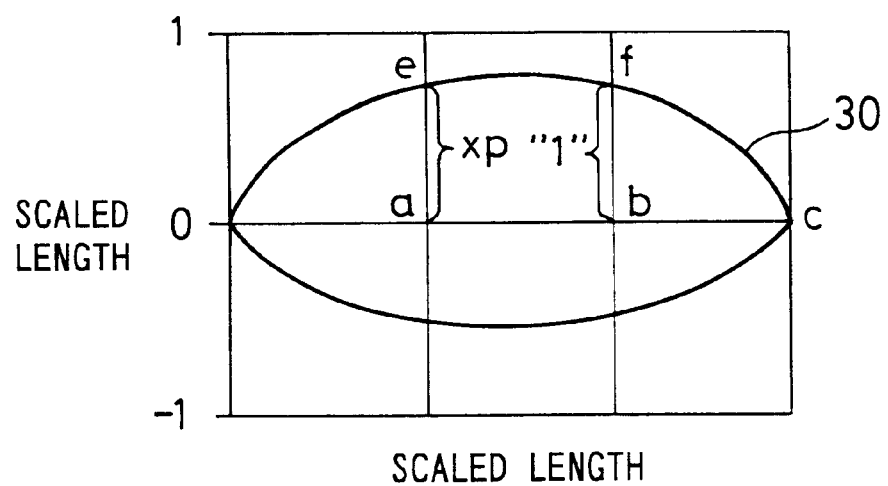
FIG. 16 is a view showing typically the shape of another object which is optimized by the object shape determining method according to an embodiment of the present invention.

FIG. 16 shows the initial cross-sectional shape for this case. The height at point "b" making up one-third of the length from zero to c in the cross-sectional longitudinal dimension of the antenna is taken as "1" and the height at point "a" making up another third of the longitudinal dimension is taken as the parameter value Xp. The four points 0, e, f and c are connected together to define a cubic elliptical curve, so as to form an upwardly convex shape. Further, the symmetrical axis zero to c defines a vertically symmetrical form, with a maximum height therefor normalized at "1".

In this case as well, the shape is determined similarly to the case of the side mirror 20.

Also in this case, in the operation for noise minimization, an optimum shape is determined using genetic algorithms. With respect to the parameter Xp ($0.8 \leq Xp \leq 1.8$), respective 7 bit ($2^7=128$) divisors are ascribed, and a genetic factor is expressed by a 7 digit binary number. Taking into consideration enlargement of operational time, the calculation is conducted under conditions of a population parameter of 5 and a generation number of 50. FIG. 17 shows a portion of the calculation results of generated noise pressure levels calculated by the genetic algorithms, with respect to various parameter values Xp.

Figure 19A:
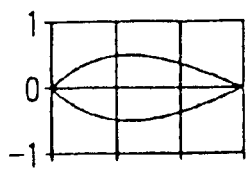
FIGS. 19A through 19O are typical views showing object shapes of another object which is determined for optimization, in accordance with the object shape determining method according to an embodiment of the present invention.
Figure 19F:
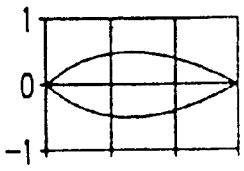
Figure 19K:
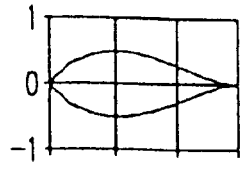
Figure 19B:
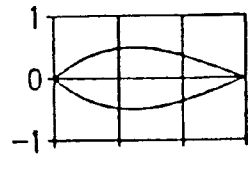
Figure 19G:
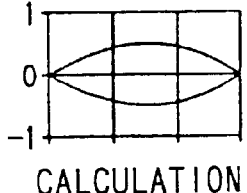
Figure 19L:
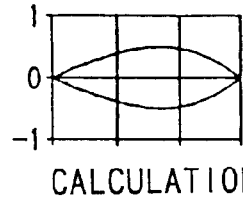
Figure 19C:
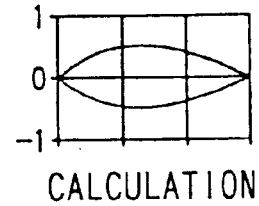
Figure 19H:
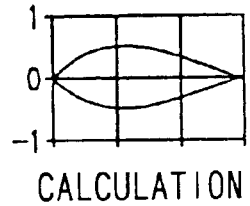
Figure 19M:
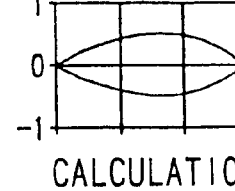
Figure 19D:
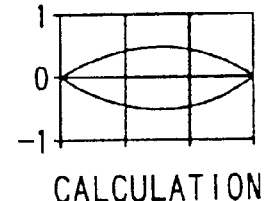
Figure 19I:
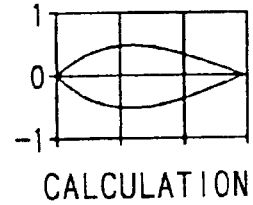
Figure 19N:
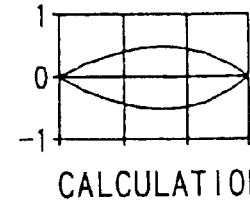
Figure 19E:
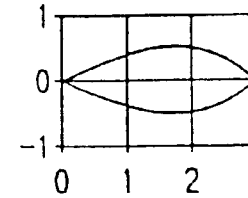
Figure 19J:
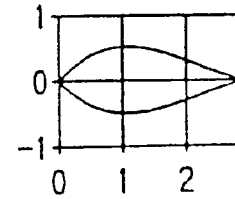
Figure 19O:
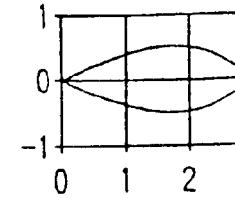

The shapes of antenna 30, with respect to portions of the calculation results shown by FIG. 17, are shown typically in FIGS. 19A through 19O. In FIGS. 19A through 19O, vertical and horizontal axes show the shape of the antenna 30 by using a unit of scaled length.

Figure 18:
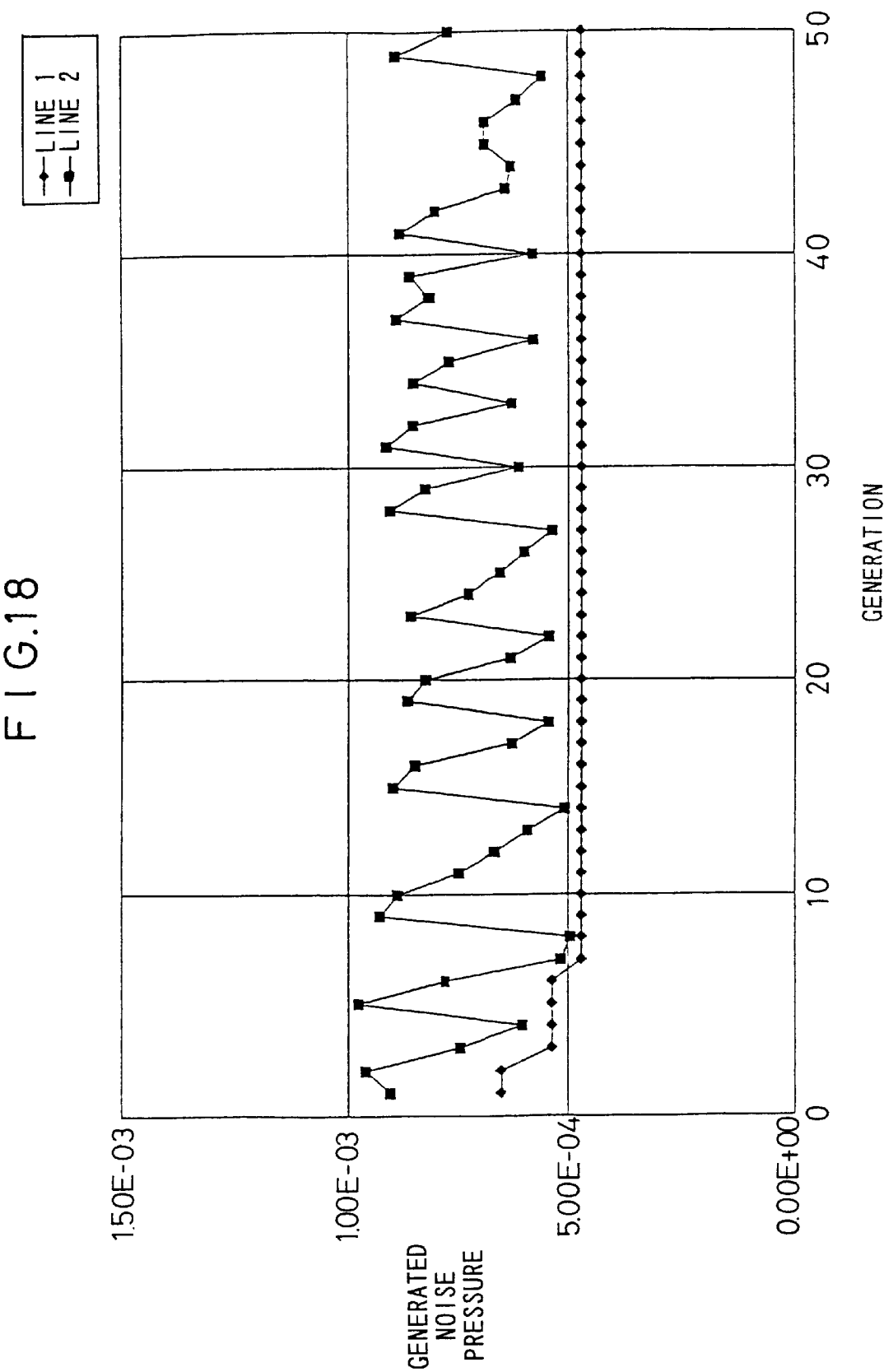
FIG. 18 is a view showing graphically generated noise pressure calculation results, in accordance with the object shape determining method according to an embodiment of the present invention.

In FIG. 18, which shows calculation results according to the genetic algorithms in this example, line 1 is a plot of the smallest generated noise pressure levels from among population parameters of 5 in each generation, whereas line 2 is a plot of average calculation results at each generation.

As made clear from FIGS. 17 and 18, the generated noise is minimal when at the calculated noise pressure level of calculation number 31, wherein the shape of the antenna 30 at this time is the shape corresponding to calculation number 31, shown in FIG. 19O.

As a result, it is decided upon that the shape of the antenna 30 having minimal generated noise is the cross-sectional shape determined by parameter Xp=0.8.

Figure 20A:
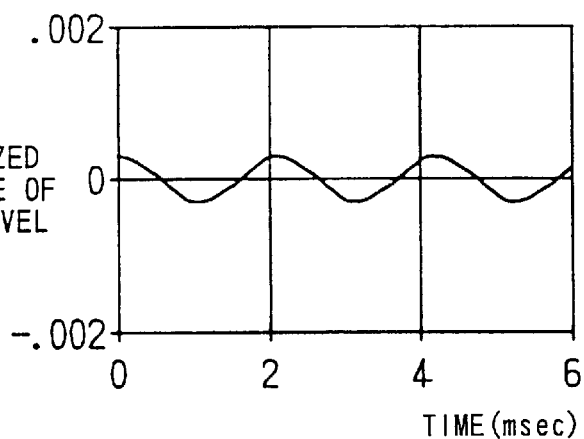
FIGS. 20A through 20C are typical views of a generated noise waveform, a frequency spectrum and an object shape of another object determined for purposes of optimization, in accordance with the object shape determining method according to an embodiment of the present invention.
Figure 20B:
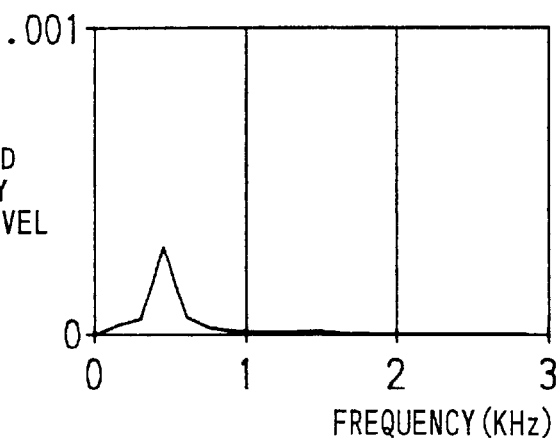
Figure 20C:
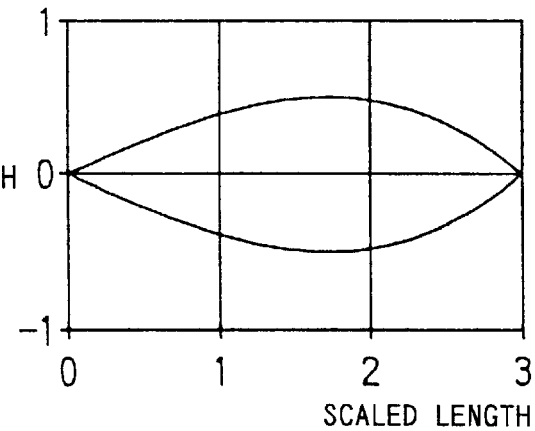
Figure 21A:
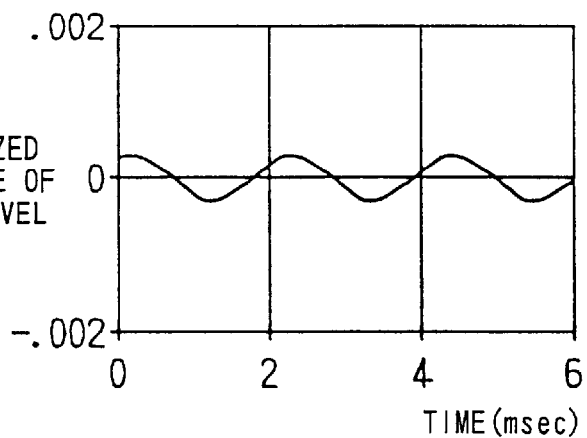
FIGS. 21A through 21C are typical views of a generated noise waveform, a frequency spectrum and an object shape of another object determined for purposes of optimization, in accordance with the object shape determining method according to an embodiment off the present invention.
Figure 21B:
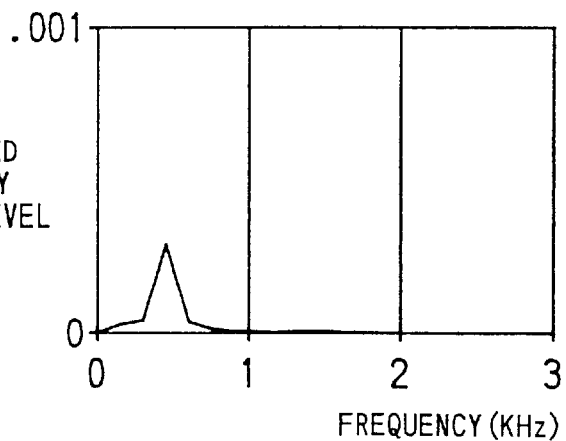
Figure 21C:
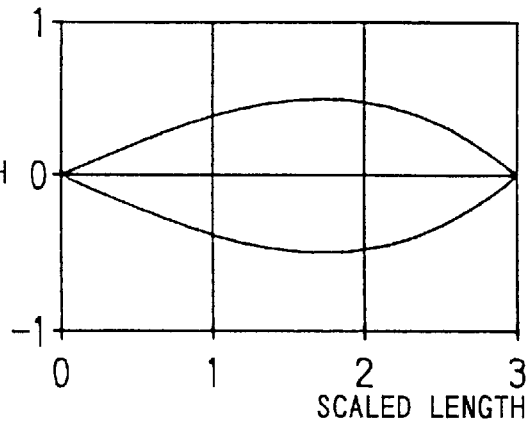
Figure 22A:
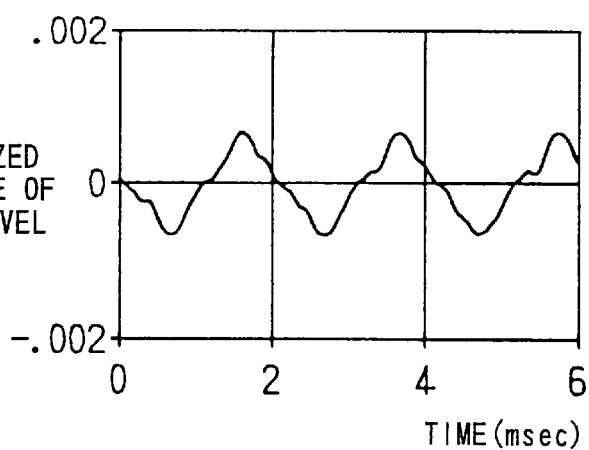
FIGS. 22A through 22C are typical views of a generated noise waveform, a frequency spectrum and an object shape of another object determined for purposes of optimization, in accordance with the object shape determining method according to an embodiment the present invention.
Figure 22B:
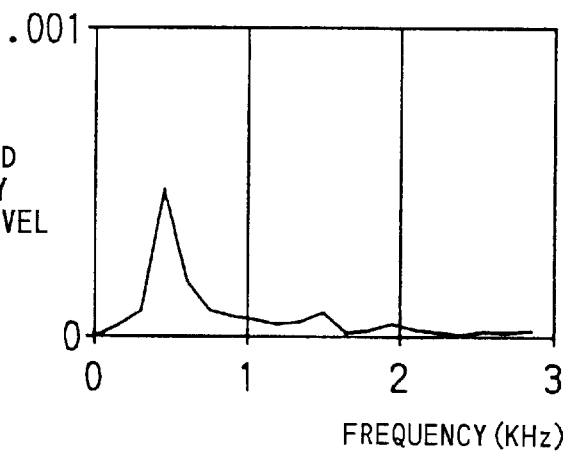
Figure 22C:
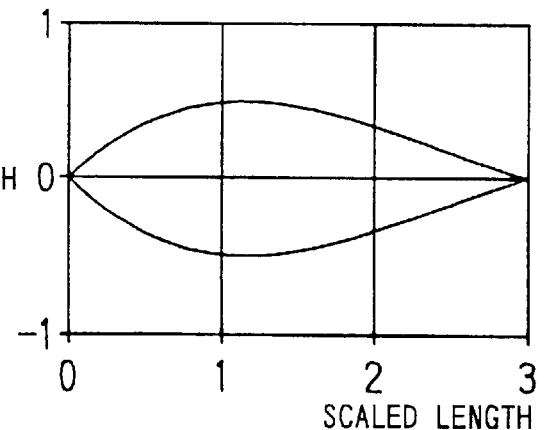
Figure 23A:
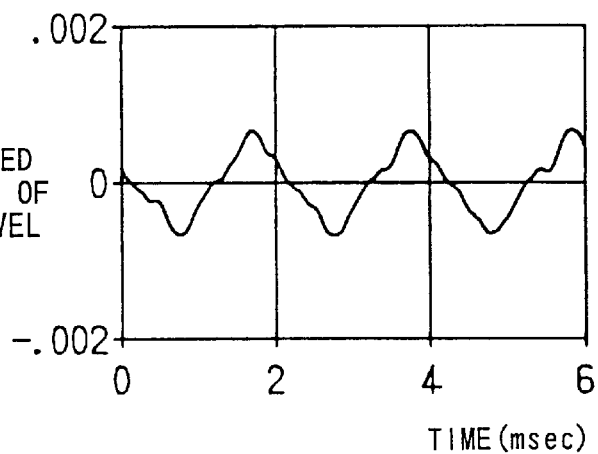
FIGS. 23A through 23C are typical views of a generated noise Waveform, a frequency spectrum and an object shape of another object determined for purposes of optimization, in accordance with the object shape determining method according to an embodiment of the present invention.
Figure 23B:
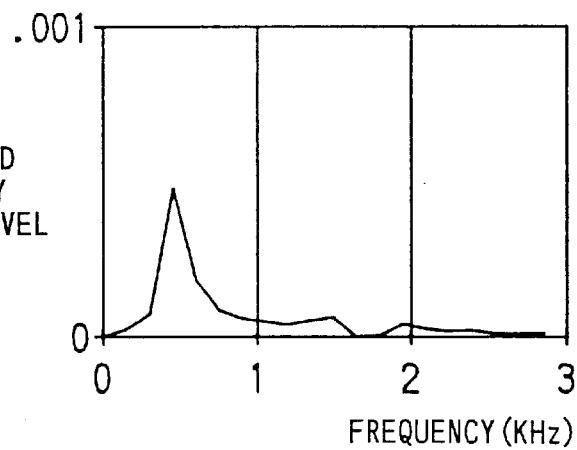
Figure 23C:
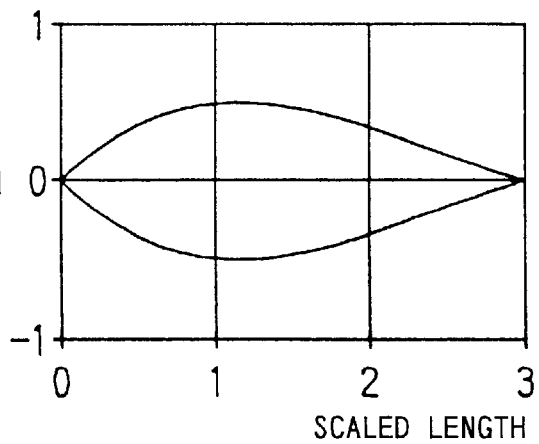

Further, the waveform of the generated noise and the frequency spectrum thereof are shown in FIGS. 20A–20C, FIGS. 21A–21C, FIGS. 22A–22C and FIGS. 23A–23C. Specifically, FIGS. 20A–20C show the case of calculation number 11, FIGS. 21A–21C show the case of calculation number 31, FIGS. 22A–22C show the case of calculation number 185, and FIGS. 23A–23C show the case of calculation number 205, respectively. FIGS. 20A, 21A, 22A and 23A show the waveform of the generated noise. Each of the horizontal axes thereof shows time and each of the vertical axes thereof shows normalized amplitude of the noise level. FIGS. 20B, 21B, 22B and 23B show the frequency spectrum. Each of the horizontal axes thereof shows frequency and each of the vertical axes thereof shows normalized frequency spectrum level. FIGS. 20C, 21C, 22C and 23C show typically the shape at that time by using a unit of scaled length for each of the horizontal and vertical axes thereof.

As explained above, according to the object shape determining method of the present invention, an object shape which minimizes generated noise can be analytically determined. Further, because the generated noise can be minimized at a stage prior to setting of the object shape, an advantageous effect is attained in that it is not necessary to undertake trial and error modifications of the shape for minimizing generated noise after a given shape has been set.

Further, in the above embodiments, the prediction of aerodynamic noise is operated according to Curle's formula. However, substantially the same result can be obtained even when M. V. Lowson's formula is used instead of Curle's formula.

What is claimed is:

1. A method of using a processor to receive signals from an input device providing an object shape by performing operations for determining the object shape that minimizes aerodynamic noise generated upon movement of the object through a fluid medium, comprising:

a first step of setting an initial object shape;

a second step of generating a numerical fluid dynamic grid on a surface of the object shape;

a third step of numerically solving, by numerical fluid dynamics, Navier-Stokes equations based on the grid generated with the object shape and the object, and determining a pressure of the object surface;

a fourth step of determining noise generated by said object by solving Curle's formula based on the pressure of the object surface; and a fifth step of updating the object shape while repeating said first through fourth steps and determining the noise thereof, wherein the shape of said object is determined based on a shape which generates the smallest noise from among the noises determined in said fifth step.

2. The object shape determining method according to claim 1, wherein updating of said object shape in said fifth step is based on genetic algorithms.

3. The object shape determining method according to claim 2, wherein the genetic algorithms are based on an elitism strategy, in which optimum individuals of each generation are reproduced and remain in successive generations.

4. A method of using a processor to receive signals from an input device providing an object shape by performing operations for determining the object shape that minimizes aerodynamic noise generated upon movement of the object through a fluid medium, comprising:

a first step of setting a parameter for successively varying and specifying an initial object shape and an object shape;

a second step of generating a numerical fluid dynamic grid on a surface of the object shape;

a third step of numerically solving, by numerical fluid dynamics, Navier-Stokes equations based on the grid generated with the object shape and the object, and determining a pressure of the object surface;

a fourth step of determining noise generated by said object by solving Curle's formula based on the pressure of the object surface; and a fifth step of updating said parameter and varying said object shape while repeating said first through fourth steps and determining the noise thereof;

wherein the shape which generates the smallest noise from among the noises determined in said fifth step is determined based on the initial shape and said parameter.

5. The object shape determining method according to claim 4, wherein updating of said object shape in said fifth step is based on genetic algorithms.

6. The object shape determining method according to claim 5, wherein the genetic algorithms are based on an elitism strategy, in which optimum individuals of each generation are reproduced and remain in successive generations.

* * * * *